J. L. HULBERT.
MILKING MACHINE.
APPLICATION FILED SEPT. 9, 1907.
971,537.
Patented Oct. 4, 1910.
4 SHEETS—SHEET 4.
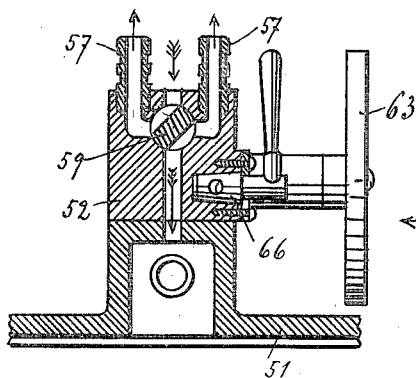
Fig. 10.
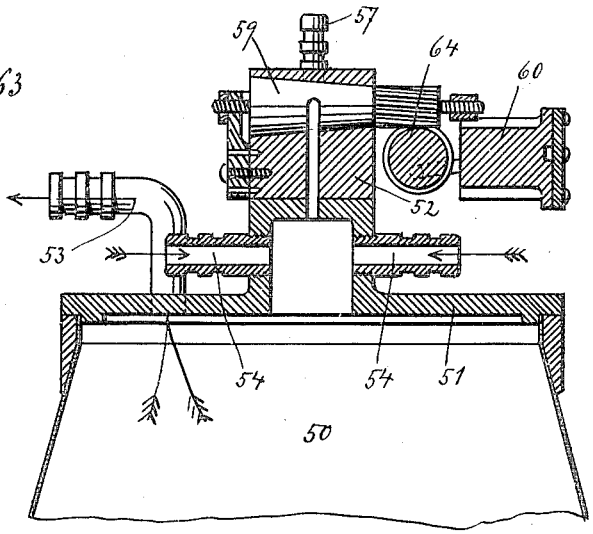
Fig. 9.
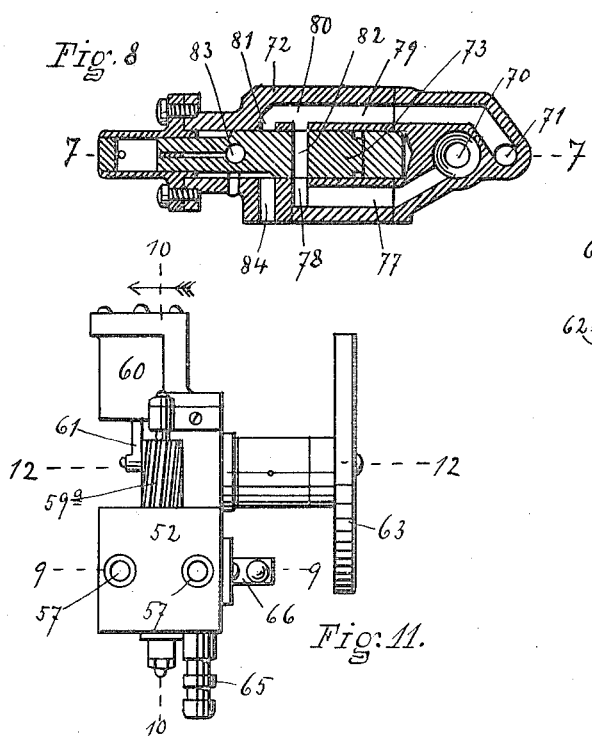
Fig. 8.
Fig. 11.
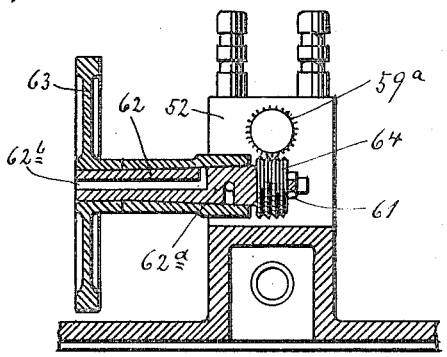
Fig. 12.
WITNESSES
Rich. A. George
E. S. Kerr
INVENTOR
JOHN L. HULBERT.
BY Robinson, Martin & Jones
ATTORNEYS.

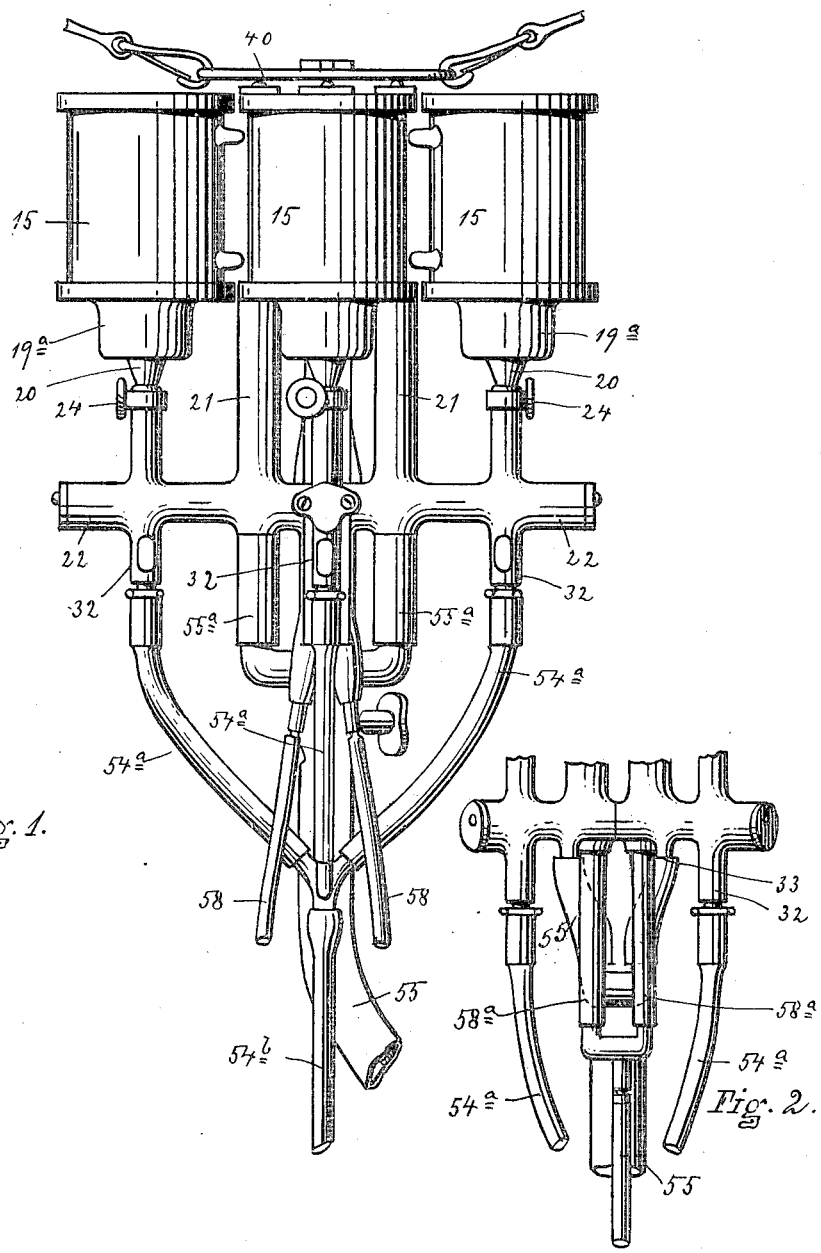

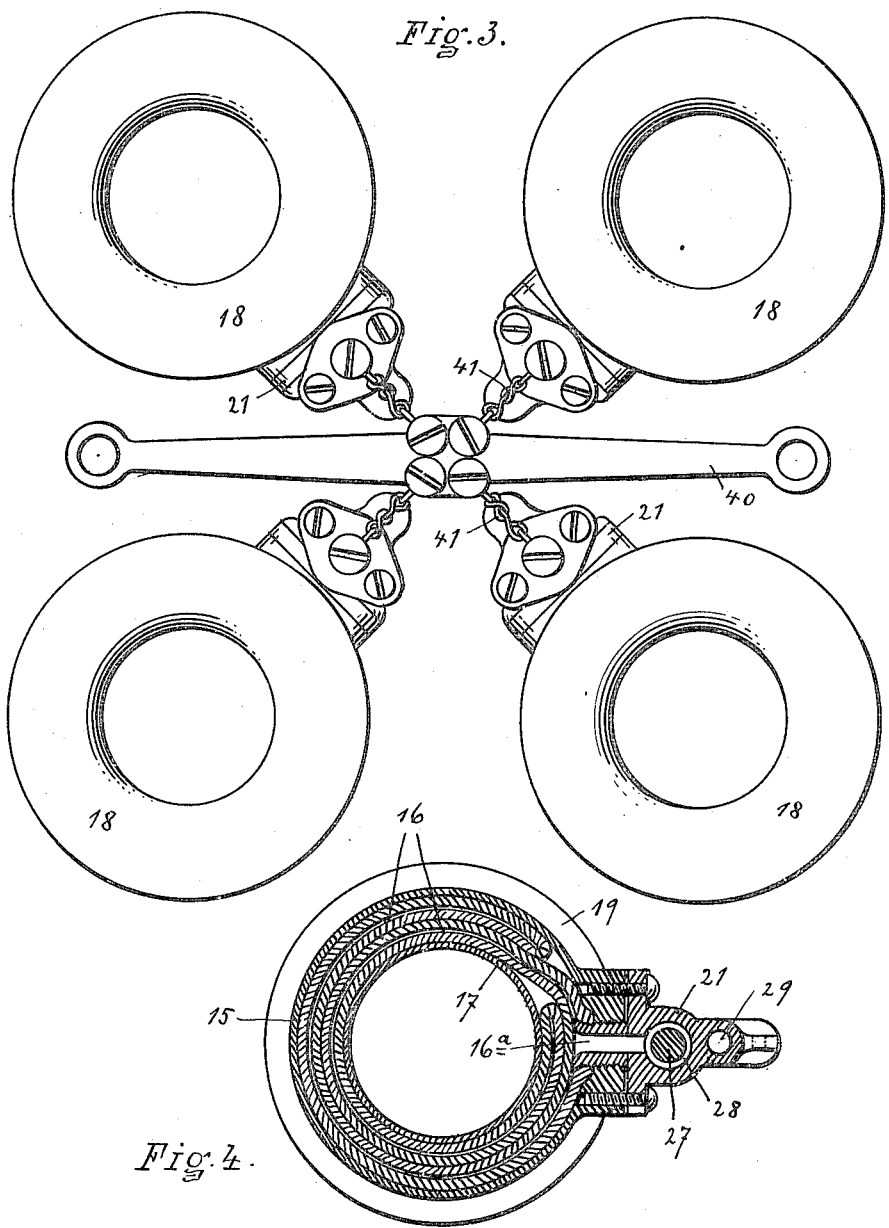

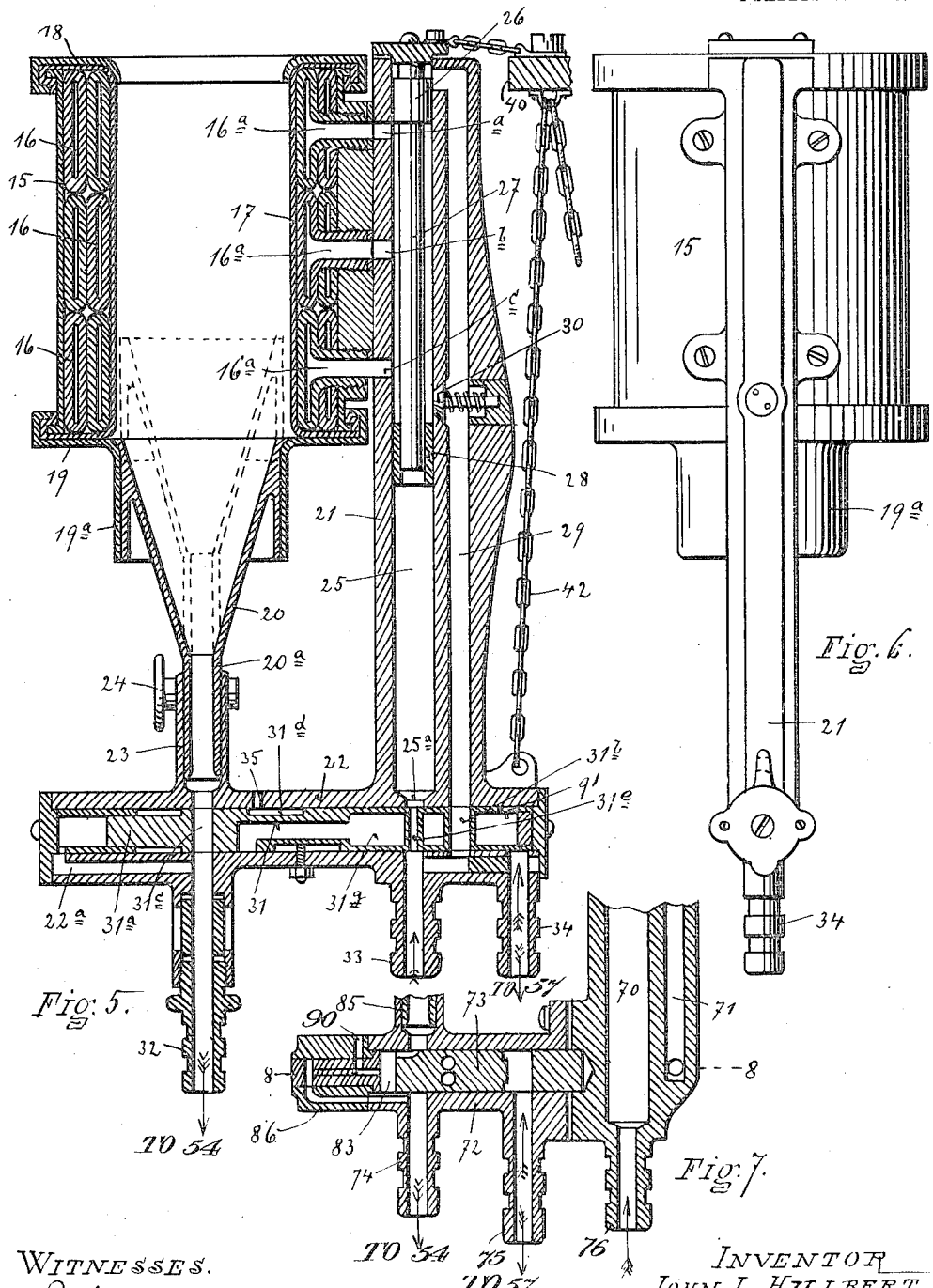

UNITED STATES PATENT OFFICE.

JOHN L. HULBERT, OF HOLLAND PATENT, NEW YORK.

MILKING-MACHINE.

971,537.

Specification of Letters Patent.　　Patented Oct. 4, 1910.

Application filed September 9, 1907. Serial No. 391,908.

*To all whom it may concern:*

Be it known that I, JOHN L. HULBERT, of Holland Patent, in the county of Oneida and State of New York, have invented certain new and useful Improvements in Milking-Machines; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my present invention is to provide certain improvements in milking machines, whereby it is simplified, made efficient and better adapted to fulfil the requirements.

Figure 1 is a side elevation of the set of teat cups constituting a part of the machine, together with portions of the tubes connecting the set of teat cups with the remainder of the machine. Fig. 2 is a detailed view showing the tube connections from a different point of view than that shown in Fig. 1. Fig. 3 is a plan or top view on a large scale of a set of teat cups and the means for supporting the same. Fig. 4 is a cross sectional view of one of the teat cups. Fig. 5 is a vertical sectional view of one of the teat cups and connected and coöperating parts. Fig. 6 is a side elevation from what may be termed the inner side of one of the teat cups and certain accessories. Fig. 7 is a vertical sectional view of a modified form of valve mechanism employed in the construction. Fig. 8 is a horizontal cross sectional view of the parts shown in Fig. 7. Fig. 9 is a longitudinal sectional view of the pulsator in connection with other details and accessories. Fig. 10 is a cross section of the pulsator. Fig. 11 is a plan view of the pulsator. Fig. 12 is a cross sectional view.

The essential working part of the machine is, of course, the set of teat cups, which teat cups consist of a rigid shell 15 within which there is provided in the construction, as illustrated, three encircling inflatable tubes 16, 16, 16. The inflatable tubes 16 make two laps or turns around the interior of the casing except at the point where the nipple $16^a$ is provided through which the tubes are inflated and deflated. Inside of the encircling tubes 16 there is provided a flexible tubular lining 17, which is passed around the upper flanged end and the lower flanged end of the teat cup shell, and held in position at these points by the rings 18 and 19 having hooked edges snapping over the flanged ends of the shell. This feature of the invention is not claimed in the present application, since it forms the subject matter of claims in my co-pending applications Serial Nos. 439,109 and 556,136, filed June 18, 1908 and April 18, 1910, respectively. The lower ring 19 has a tubular extension $19^a$, which receives the adjustable funnel-shaped closure 20 of the lower end of the teat cup. Each teat cup is provided with a vertically-extending elongated member 21 constituting a valve casing and affording fluid passages and projecting downwardly in an arm carrying the horizontal valve casing 22. The funnel-shaped closure 20 is adjustably supported on the part 22 by being provided with a cylindrical tubular extension $20^a$ received in a tubular clamp 23 on the part 22, and the closure 20 is held in its positions of adjustment by a screw 24 controlling the clamp 23.

The member 21 is provided with an elongated vertical valve chamber 25 containing the valve consisting of the closely fitting head portion 26 and the stem portion 27. The stem portion of this valve fits closely but slides freely through the fixed sleeve 28 provided in the valve chamber, and which reduces the area at this point. The upper portion of the valve chamber 25 is provided with the three ports $a$, $b$ and $c$ connected respectively with the upper, middle and lower inflatable tubes 16. In the member 21 there is also provided a fluid passage way 29, which at its upper end opens into the valve chamber 25 and intermediate of its length and just above the sleeve 28 also is placed in communication with the valve chamber 25 through a port normally closed by a spring-held puppet valve 30. In the valve casing 22 there is provided a reciprocating valve 31, which, at its outer end, is reduced in diameter, as indicated at $31^a$, whereby the available pressure receiving surface on the end is reduced from that provided on the opposite end of the valve 31. The casing 22 has fittings 32, 33 and 34 for the ready attachment of three flexible tubes. The valve 31 is provided with a passage $31^b$, which, when the valve is in the position shown in Fig. 5, places 33 in communication with 29, and when the valve is in the opposite or left-hand position places 33 in communication with 25 through a small hole or passage at 25ᵃ. The valve 31 is also provided with a passage 31ᶜ, which, when the valve is in the position shown in Fig. 5, places 32 in communication with the teat cup, and when the valve is in the left-hand position closes the passage through 32. The teat chamber of the teat cup is vented through the passage 31ᵈ and the opening 35 through the wall of the valve casing 22 when the valve 31 is in the left hand position. The valve 31 is also provided with a cross passage 31ᵉ, which, when the valve is in the right-hand position shown in Fig. 5, places 33 in communication with the small opening 25ᵃ into the bottom of the valve chamber 25. The valve 31 is also provided with still another passage 31ᵍ, which, when the valve is in the left-hand position places 32 in communication with 29 through a small port 91, which takes a position opposite 29, and when the valve is in the right hand position, as shown in Fig. 3, is entirely idle.

For the purpose of supporting the set of teat cups there is provided a bar 40, which is connected by short chains 41 or other suitable flexible connections with the upper ends of the teat cups, and is connected by a substantially vertical chain or connection 42 with the lower end of the arm projecting downwardly from the teat cups. The bar 40 may be supported by a strap passing over the animal's back, and it will be noted that the teat cups are supported from the bar in the manner described, which allows considerable freedom in placing them in desired position.

In connection with the set of teat cups or several sets of teat cups, if desired, there will be provided a closed receptacle 50 having a cover or head 51 on which the pulsator 52 is preferably mounted. A partial vacuum will be maintained in this receptacle 50 through the medium of a suitable exhausting apparatus attached in any desirable way, as, for instance, by means of the tube 53. From a suitable fitting, as 54, communicating with the interior of the receptacle 50, a flexible tube 54ᵇ, which will be termed a milk tube, will be carried to the set of teat cups, and after branching into branches 54ᵃ make connections with the fittings 32 of each of the several teat cups. From a suitable pumping or pressure supplying apparatus, a flexible air tube 55 is brought, which, after passing through a stop cock 56, branches and is connected by short flexible tubes 55ᵃ with the fittings 33 on the lower ends of the several teat cups, including their accessories. From the two fittings 57 on the top of the pulsator, two flexible suction tubes 58 are carried to the set of teat cups, and each of these tubes 58 branches into two members 58ᵃ, which respectively are attached to the fittings 34 before mentioned.

In order to place the partial vacuum maintained in the receptacle 50 in communication first with one of the tubes 58 and then in communication with the other tube 58, there is provided in the pulsator a rotatable valve 59 having passages adapted to place one of the fittings 57 in communication with the interior of the receptacle 50, as shown in Fig. 10, and the other fitting 57 in communication with the outer atmosphere, also as shown in Fig. 10. As this valve 59 is rotated, it reverses the arrangement whereby first one of the fittings 57 and then the other is placed in communication with the receptacle 50 and with the external atmosphere. For operating or rotating the valve 59, there is provided an engine consisting of a single acting cylinder 60 with piston and connecting rod 61 connecting with a crank pin on a rotary shaft 62, having a bearing in the pulsator frame and carrying on its outer end a fly wheel 63. The crank pin disk 64 is provided with a screw thread on its periphery, which meshes with gear teeth 59ᵃ on one end of the valve 59 so that as the engine runs and the crank disk rotates the valve 59 will be slowly rotated. The portion of the same air or fluid under pressure which is utilized through the tube 55 for operating the teat cups may be used to drive the engine, and provision for a connection for so doing is made in the fitting 65. From this fitting a passage is provided through the throttle valve 66 to the cylinder, and a valve mechanism is provided in that portion of the shaft 62 indicated by 62ᵃ for controlling the inlet and exhaust to the cylinder, the details of which it is not deemed necessary to specify. But it may be noted that the exhaust from the cylinder takes place through the passage 62ᵇ through the end of the shaft 62.

When the partial vacuum is produced in the receptacle 50, as before mentioned, the same is communicated through the medium of the tube 54 to the fitting 32 on the set of teat cups. When the valve 31 is in the left-hand position, being the opposite position from that shown in Fig. 5, the passage to the closure at the lower end of the teat cup will be closed and the suction will tend to maintain the valve in the left-hand position acting through the passage 22ᵃ. In one of its positions the rotary valve 59 of the pulsator also makes the suction or partial vacuum existing in the receptacle 50 available through one of the tubes 58 and the fitting 34 to the other end of the piston valve 31. While the vacuum pressure is the same on both ends of the valve per square inch, the area of the right-hand end of the valve exceeding that of the left-hand end the valve is moved over by this suction to the right-hand position as long as the suction at the fitting 34 is maintained. When in the left-hand position the fluid under pressure, preferably compressed air, supplied at fitting 33, finds its way through the passage way 31$^b$ in the valve and the small opening 25$^a$, and acting on the stem portion of the valve 26 serves as a spring to move it into its upper position as shown in Fig. 5 of the drawing. When the piston valve 31 is moved to the right-hand position, the fluid under pressure supplied through 33 not only is still available under the lower end of the stem of the valve 26, but also passes through the passage 29 to the upper end of this valve, and, the area of the valve being greater than that of the stem, the valve drops down exposing successively the ports a, b and c opening into the several inflatable tubes. These tubes are thus successively inflated and the inflation continues until the valve 59 of the pulsator has rotated into position to cut off the connection through the tube 58 with the interior of the receptacle 50 and put the same in communication with the atmosphere. When this takes place the suction on the right-hand end as shown in Fig. 5 of the valve 31 is relieved and the continuous suction on the left-hand end of this valve causes it to shift to its left-hand position. While in its right-hand position the passage 31$^c$ through the valve 31 places the suction through the tube 54 in communication with the lower end of the teat and the milk is received and passed off through this tube 54 to the receptacle 50. When the valve 31 shifts to the left-hand position, the suction on the lower end of the teat is relieved by opening the same to the atmosphere through the passage 31$^d$ and the opening 35. The suction through the tube 54, however, is made available at this time through the passage 31$^e$ and passage 29 and opening of valve 30 to deflate the encircling tubes of the teat cup. In the deflation of the encircling tubes provision is made for taking the air out through the opening closed by the valve 30, which is spring held and automatically opens, and the movement of the valve 26 at the same time to the upper position under the influence of the compressed air supplied in the lower end of the valve chamber does not interfere with the deflating of the encircling tubes.

It is evident that the tubes in the four teat cups could be simultaneously inflated and deflated, in which case only one of the fittings 57 would be required on the pulsator, and the tube 58 would be divided and attached to all four of the fittings 34, but I prefer the construction shown wherein provision is made for operating one pair of the teat cups alternately with the other pair.

In case of a short teat where the full length of the teat cup is not required, the lower portion can be cut out of action by adjusting up more or less toward the dotted position shown in Fig. 5 the funnel-shaped closure 20.

In Figs. 7 and 8 is shown a modified form of construction of valve casing and accessories, which may be employed instead of the valve 31 with its casing and accessories. Referring to these Figs. 7 and 8, 70 is the lower end of the valve chamber similar to 25. 71 is the lower end of passage similar to 29. The valve casing 72 receives the cylindrical reciprocating valve 73 and is provided with three fittings 74, 75 and 76 adapted for attachment of hose, the first being similar to 32 previously mentioned and having a continuous suction, the second being similar to 34 and having intermittent suction, the third being similar to 33 and supplied with a constant fluid pressure. Communicating with the lower end of 70 is a passage 77 which opens into the valve chamber through a port 78. A passage 79 is also provided which connects with 71 and opens into the valve chamber of the casing through two ports 80 and 81. The valve 73 is similar to the previously described one in that it is of small area at one end and larger at the other, the smaller end operating in a small cylinder at one end and the large end operating in a larger cylinder at the other end. This valve 73 is provided with a cross port 82 and a vertical passage or port 83, the former adapted to register with ports 78 and 80 and also with a port 81 and 84 the latter opening to the atmosphere. The port 83 is adapted to register with the passage through the fitting 74 and with an opening into the lower end of the sleeve 85, which is similar to 23 previously described, and receives and supports the teat cup closure 20. When shifted to the left-hand position, as shown in Fig. 7, the passage 83 is adapted, in connection with the others shown in Fig. 7, to vent the passage in 85 through hole 90.

It will be noted that there is also provided from 74 a passage 86 to the left-hand reduced end of the valve, while the right-hand end of the valve takes a position substantially at the fitting 75. The operation of this construction is substantially the same as the one previously described, except that instead of utilizing a suction to deflate the encircling tubes of the teat cups they are simply exhausted to the outside atmosphere.

It is evident that other modifications and changes in and from the construction herein described may be made without departing from the spirit of my invention.

What I claim as new and desire to secure by Letters Patent is:

1. The combination in a milking machine of a set of teat cups having depending arms, a supporting bar approximately in the plane of the top of the cups, flexible connections from said bar to the tops of the teat cups and to the lower ends of said arms, substantially as set forth.

2. The combination in a milking machine of a teat cup having an inflatable lining, a downwardly projecting arm and a radial valve case in the axial line of the teat cup, a funnel-shaped adjustable closure for the lower end of the teat cup mounted on said valve casing and adapted to enter the lower end of the teat cup inside of the lining more or less, substantially as set forth.

3. The combination in a milking machine of a rigid cylindrical teat cup shell, a plurality of inflatable tubes in the shell encircling the teat chamber thereof, a closure for the lower end of the teat chamber adjustable into the chamber, means for applying an intermittent suction to the lower end of the teat chamber, and means for supplying fluid under pressure to said inflatable tubes and deflating them, substantially as set forth.

4. The combination in a milking machine, of a rigid teat cup shell, a plurality of inflatable tubes in the shell encircling the teat chamber thereof, means for inflating and deflating said tubes, a closure for the lower end of the teat chamber adjustable to a position within the chamber, and means whereby said closure may be adjustably held more or less within the field of action of the inflatable tubes, substantially as set forth.

5. In a milking machine, a teat cup having an inflatable lining and closed at the lower end, means for supplying fluid under pressure to and exhausting the inflatable lining, means for applying suction at the closed lower end of the teat cup, and an individual valve for each teat cup mounted thereon and controlling the inflation and deflation of the teat cup lining and the suction on and relief on the lower end of the teat cup, substantially as set forth.

6. The combination in a milking machine of a set of teat cups, each having a flexible lining dividing the interior of the cup into a series of fluid receiving chambers, and a teat receiving chamber, a closure for the lower end of the teat chamber, a vacuum receptacle, a connecting tube between the teat receiving chamber of the teat cup and the vacuum receptacle, means for introducing fluid into and removing it from the fluid chambers of the teat cup, individual valves for each teat cup controlling the suction and the fluid supply thereto, and means for operating said valves by fluid pressure, substantially as set forth.

7. The combination in a milking machine of a rigid teat cup shell having a tubular extension at its lower end, a plurality of inflatable tubes lying around the inner wall of the teat cup and encircling the teat chamber thereof, a funnel-shaped closure for the lower end of the teat chamber slidably mounted in the tubular extension and adapted to be adjusted into a position in the chamber within the area of the inflatable tubes, means for inflating and exhausting the inflatable tubes, and means for applying suction to the funnel-shaped closure, substantially as set forth.

8. The combination of a rigid teat cup shell, a plurality of inflatable tubes lying around the inner wall of the shell and encircling the teat cup chamber thereof, a funnel-shaped closure for the lower end of the teat cup chamber and adjustable to a position within the lower end of the teat cup chamber and within the area of the inflatable tubes, substantially as set forth.

In witness whereof, I have affixed my signature, in presence of two witnesses, this 29th day of Aug. 1907.

JOHN L. HULBERT.

Witnesses:
W. N. ROBERTS,
ELIAS W. JONES.